April 20, 1954     M. D. BERGAN     2,675,774
METHOD OF MAKING CABLE CONNECTORS
Filed April 26, 1950

INVENTOR.
MARTIN D. BERGAN
BY
James C. Ledbetter
ATTORNEY.

Patented Apr. 20, 1954

2,675,774

UNITED STATES PATENT OFFICE 2,675,774

METHOD OF MAKING CABLE CONNECTORS

Martin D. Bergan, Westfield, N. J., assignor to The Thomas & Betts Co., Elizabeth, N. J., a corporation of New Jersey Application April 26, 1950, Serial No. 158,169

1 Claim. (Cl. 113—119)

This invention is presented for the purpose of resolving problems concerning connectors and especially relates to a cable connector having a new tubular body of dual-diameter form, and of improved utility, with view openings facilitating inspection of electrical conductors (insulated wiring) extending through the connector.

Cable connectors of the conventional form and class herein treated comprise non-conductive fittings for anchoring "large size" spiral-armor within "small size" standard knock-out openings or holes in conduit boxes forming part of a run or raceway system enclosing current transmission lines, that is, the insulated electrical wiring or conductors of power and lighting circuits, the composite spiral-armor and enclosed conductors being the "cable."

In the manufacture of such dual-diameter cable connectors—especially when forming them of sheet material, as herein improved—it is necessary to employ flat sheet metal blanks (cold rolled steel) die-formed or pressed and rolled into cylindrical or tubular body shape, in order to provide a small diameter cylindrical front or inner neck end adapted to be anchored in the standard knockout hole of a small or medium size box, as well as provide a large diameter rear or outer end for receiving and securing a large cable therein. Concerning the types of cable, to which my new connector is adapted, one is known as BX which is pre-wired, while another is known as flexible-metallic conduit which is wired during the raceway installation work and is similar to BX cable.

Both types of cable include a spiral-armor sheath providing a flexible raceway enclosing the insulated electrical wiring; and my new connector is adapted to large size spiral-armor, that is, the requirement (among other things) of securely anchoring it in a knock-out opening which, in some raceway installations, may be of smaller diameter than that of the spiral-armor.

It is known to those conversant with the art that cable connectors (for securing spirally-armored insulated wiring in a conduit box) should be provided with inspection apertures or view openings which are usually called "peep-holes." Such requirement, when adequately met, enables a wiring inspector to examine with greater assurance the condition of the insulation on the closely packed electrical wires emerging from the jagged end of the spiral-armor at the critical or danger point of the raceway where the wires extend from the front end of the connector into the conduit box—for it is here that a "short circuit" is most likely to develop and cause fire, especially so if the wiring mechanic has broken or damaged the wiring insulation when threading and pulling the conductors into the box.

An approved wiring installation essentially includes a conventional "anti-short liner" or bushing comprising a "red" sleeve-like fiber reinforcement which the mechanic should place around the insulated wires. This anti-short liner should be pressed and fitted into the spiral-armor, at its jagged cut end, to insure against wear and abrasion of the insulation. It is well known that such protective liner must be so placed as to mask and isolate the rough or burred end of the spiral-armor from the insulation.

My invention provides a check-up "tell-tale" against any wiring mechanic who may carelessly fail to prepare properly the rough-cut burred end of spiral-armor in disregard of fitting the essential anti-short bushing into place, that is, around the insulation of the wires, at and within and covering over said rough-cut armor edges to insure against pricking the insulation.

Since the "red liner bushing" is wholly within the connector, also partly concealed within the end of the spiral-armor, a problem exists in rendering it "visible" to a wiring inspector, whose duty it is to see that his anti-short protective bushing is in place, before he approves the electrical installation. And this invention not only seeks a more effective solution of such problem than now afforded by the art but also a simplification of connector manufacture as well.

Accordingly, my general purpose is to produce a new form of tubular body connector for spiral-armor, which renders visible the red anti-short liner, in order that the wiring inspector may obtain a good "look" at it through the new "peep-holes" which this invention provides at the front end of the body.

On the other hand, a specific purpose of the invention is to produce a sheet metal cable connector, having a dual-diameter body, the front small end of which—during its machine-forming operation—contributes to the fashioning of the required peep-holes by virtue of the geometrical technique herein discovered for forming said smaller end, thus simplifying manufacture.

This specification with accompanying drawings explains the invention as preferred and embodied at this time for an understanding of the problems sought to be solved. Since the teachings herein may suggest structural changes to others who wish to avail themselves of the benefits of the invention, it is pointed out that subsequent modifications hereof may well be the same in spirit and principle as this disclosure.

The drawings are made from a production specimen blank and finished tubular body rolled-up therefrom, thus affording exactness in scale and relation of the different areas and portions of these two parts.

Fig. 1 shows an end edge elevation of a preformed sheet metal blank from which the connector is machine-formed; and Fig. 2 is an inside plan view thereof.

A lengthwise segmented portion or area is shown in the lower part of both views and constitutes the smaller stock portion of the flat blank which forms the "front small end" or neck of the tubular body having an "annular flange" containing "peep-holes" formed therein by my novel method. My invention is focused at these three quoted features, by which is produced the new spiral-armor cable connector (shown in the last three views of the drawings) for raceway work at and in a conduit box which is one of the more critical or "short circuit" danger points of a conventional electrical raceway system.

Fig. 3 is a side edge elevation projected down from the blank shown in Fig. 2, its segmented portion being disposed in a plane above the flat bank, and thus inwardly offset.

The first three views show an example of the sheet metal blank in its advanced pre-formed stage, the partially formed blank being characterized by the fact that its stock is offset in two parallel planes. The last three views show the tubular body (in fact a complete connector) made from the blank by the new method herein.

Figure 1:
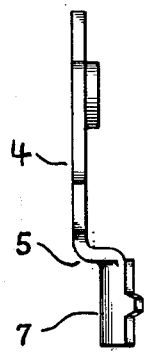

The illustrations reveal the method involved and the structure resulting from die-forming a flat sheet metal blank into tubular body form, having (1) specially-shaped peep-holes of maximum size in the front portion of the connector, and also having (2) a reduced diameter neck or front end portion. The geometrical pattern devised and embodied in the pre-formed blank, for achieving these two features, is believed to be unique and a contribution to the art.

Further reference is made to the drawings for a detailed description of an illustrated example of the invention. It is pointed out that single digit part numbers are used for reference in the first three views showing a pre-formed sheet metal "flat" blank, while the same digits are employed in the teen-number series for the same parts after being die-rolled into "tubular" shape as seen in the last three views showing the completed cable connector.

An elongated rectangular shaped sheet steel blank 4 with parallel side edges is made from strip stock. This blank may have an undercut latch-in tongue and groove, or other conventional means, fitted and welded at its ends for integrating a tubular body 14 (the last three views) when the blank is curled or rolled into cylindrical form to complete the connector body. Thus, the "flat" 4 of the blank becomes the "cylinder" 14 of the cable connector.

It is observed that a linear flange 5 offsets approximately one-third (say less than one-half) of a lengthwise area of the blank along one of its sides. This fashions and divides the blank into parallel planes, that is, two adjacent planes, by which to attain the dual-diameter or two-size tubular body and thereby achieve the purposes of the invention.

The offset one-third lengthwise smaller area is further die-formed by punching it with equal size and equally spaced notches or cut-outs in the form of symmetrical and rectangular shaped openings 6 to make a segmented area along one side edge (the inwardly offset portion) of the blank. The several openings are disposed perpendicular to the longitudinal axis of the blank, extend through the inwardly offset parallel smaller area, and also back into the larger area of the flat blank 4. Thus, the openings 6 intersect the linear flange 5 for a short distance into the larger area of the blank 4. Among other features, this specified profiling discovered in devising the blank 4 as a whole is an important measure of my invention. When the blank is curled and fashioned into tubular body form, the "rectangular" shaped openings 6 which extend into the larger area 4, are transformed into "triangular" shaped view openings or peep-holes 16 in the completed connector.

From the foregoing, it is seen that the open areas of the rectangular openings 6, as cut in the offset portion of the blank, provide a number of equal width and equally spaced segments 7. Four such segments of symmetrical form are shown in this example of the invention, each segment 7 being fashioned arcuately on a radius to produce a reduced size neck 17 in the finished connector. Note also that each segment 7 is formed on an axis perpendicular to the linear flange 5, and they are coplanar.

Incidentally, the two parallel edges of each segment 7 are provided with conventional dowel-centering tongue and groove means. This or other suitable means aids in aligning and integrating the adjacent edges of the segments 7 when rolled into tubular form and welded or brazed to make an integral tubular body.

As previously indicated, the illustrated sheet metal blank is in its advanced stage of die-formed production. In a word, the blank shown comprises the last die-forming step just prior to curling it into tubular body form. The addition of a cable clamping set screw, as well as screw-threading the neck 17 to receive a lock nut, makes a complete cable connector for anchoring the rough-cut and prepared end of a large spirally-armored cable within a small knock-out opening of a conduit box. The set screw 18, as a cable fastener, may be omitted and a more effective means employed for clamping the prepared end of spiral-armor within the body 14 of the connector.

It is appreciated that those skilled in the art understand the procedure of die-forming flat strip material and also rolling it into tubular form, as in conventional practice. Thus, the final stage of the pre-formed blank, as shown in the first three views (just before curling it into cylindrical form), is believed to illustrate the principles of the invention involving my new practice herein.

Accordingly, the several steps and stages of shaping the blank—prior to attaining its ultimate pre-formed shape as herein illustrated—are omitted for the purpose of clarity. And the same is true of other conventional parts mentioned as a setting and environment for my invention.

Figure 2:
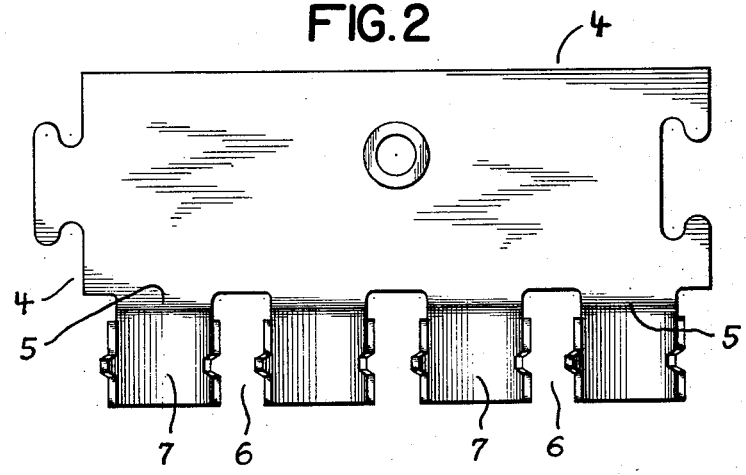
Figure 3:
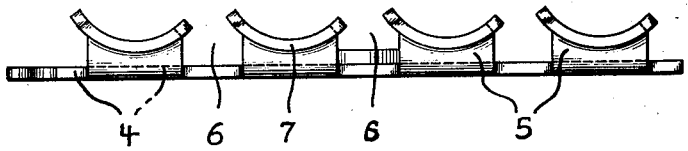
Figure 4:
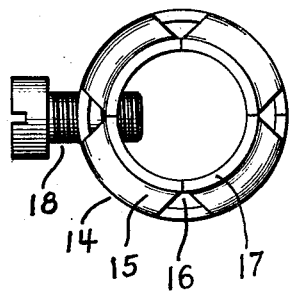
Fig. 4 shows a front end elevation of the completed tubular body of dual-diameter form—with a set screw mounted therein as an example of the simplest known means for clamping a cable in the body—thus showing a finished connector.
Figure 5:
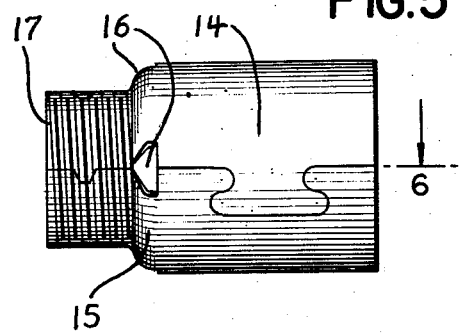
Fig. 5 shows a lengthwise elevation of the connector viewed from the side opposite its clamping or set screw.
Figure 6:
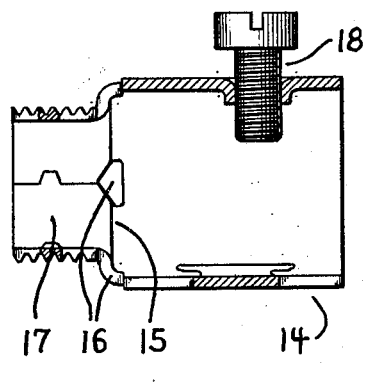
Fig. 6 shows a longitudinal section on the line 6, of the tubular body cable connector.

Referring to the last three views in the drawings, it is seen that the several triangular shaped peep-holes 16 are formed within the annular flange 15. It was discovered as being essential, in devising a geometrical pattern for my novel preformed blank, to develop a new shape or profile (Fig. 2) which would locate the peep-holes 16 in the annular flange 15. The profile or outline of the illustrated blank was found to achieve the desired results upon reduction of the blank to cylindrical form and also to make for the largest possible open area for the peep-holes 16.

The geometrical lay-out of the open area 6 and arcuate segments 7—when the blank is rolled into tubular form—provides peep-holes 16 in the shape of an isosceles triangle, being another feature of the invention. Each peep-hole has its long side rolled or formed in the larger tubular body 14, parallel to the plane of the annular flange 15, with its other two equal-length sides rolled and disposed across the flange, and the apex of said two equal length sides of the triangle located in the rear end of the small neck 17.

The rolling or curling of the pre-formed sheet-metal blank (the large flat portion 4 thereof), into the final form of a tubular body 14, is accomplished in a conventional manner by a die-forming operation. Since the four neck segments 7 were previously die-formed on a radius equal to the radius of the small neck 17, there remains only the method step of rolling up the large flat area 4 of the blank along with its edgewise linear flanges 5. Both of these portions 4 and 5 are curled in and by a conventional automatic slide machine or other die-driving press, the edgewise flanges 5 being held in a known manner, against buckling out of shape, by the forming-die means.

The dies confine the edgewise linear flanges 5 under pressure, the force of which obviously produces a cold-flow, i. e., a compressing and stretching of the metal stock, and results in annularly shaping said straight flanges 5 into the circular flange 15. This operation goes along with the curling of the tubular body 14, also with the inward folding of the cut-outs 6 to form the peep-holes 16, as well as to form the reduced size neck 17.

Accordingly, it is seen that this invention stems from a method function which is wholly new in this particular art, a function and manufacturing step never before performed in the production of dual-diameter tubular bodies for cable connectors of the peep-hole type. This novel function presents the further advantage of marked economy in manufacture because the know-how in the invention has so contrived the method that it can be practiced with standard machine tool equipment.

The patterned arrangement of the method steps locates the larger open area portion of the peep-holes 16 within the large tubular body 14 and also within the outer portion of the annular flange 15. Thus devised, there is the advantage of more fully exposing to view the red colored anti-short bushing within the connector when the latter is mounted on the end of a spiral-armor cable prepared for connection with a conduit box. Since the box hole embraces the neck 17 up to the annular flange 15, my particular location of the greater portion of the peep-hole area affords a wiring inspector an effective wide open view into the front end of the tubular body.

The invention provides for tubular body production from strip material of minimum width and hence makes for economy. In seeking the latter and devising this production method, other geometrical shapes were discarded in favor of the punched cut-outs 6 and the arcuate die-formed neck-segments 7. This unique pattern results in simultaneously (during the rolling-up operation) forming the particular shaped peep-holes 16, locating them to best advantage in the tubular body, and shaping the neck 17.

This disclosure explains the principles of the invention and the best mode contemplated in applying such principles, so as to distinguish the invention from others; and there is particularly pointed out and distinctly claimed the part, improvement or combination, which constitutes the invention or discovery, as understood by a comparison thereof with the prior art.

The invention is presented to fill a need for a new and useful cable connector. Various modifications in construction, mode of operation, use and method, may and often do occur to others, especially so after acquaintance with an invention. Accordingly, it is to be understood that this disclosure is exemplary of the principles herein and embraces equivalent constructions.

What is claimed is:

In a method for producing a cable-connector tubular-body of dual-diameter form, with a large rear end adapted to receive a large cable, and a small front end adapted to fasten into a small size box hole; comprising the steps of die-forming an elongated rectangular shaped blank, having parallel lengthwise side edges, by pressing a linear flange inwardly of the blank, parallel with and near one of its side edges, from end to end thereof, and thereby offsetting inwardly a small area of less than one-half of the area of the entire blank, thus forming said blank in two parallel planes; and punching the inwardly offset small area of the blank with transverse generally rectangular shaped cut-outs, parallel to each other, and extending through the linear flange back into the large area of the blank, thus forming segments which are parallel, also which are in both planes, and which have their larger area in the offset plane; and die-forming that larger portion of each segment, which is in the offset plane of smaller area, on an arc with a radius equal to that of the small front end of the tubular body, but leaving the smaller area of each segment flat in the larger area of the blank, and the axes of the arcs being perpendicular to the linear flange; rolling said larger flat area of the blank pre-formed as aforesaid into cylindrical shape, fashioning the body into one of dual-diameter, and transforming the transverse generally rectangular shaped cut-outs, which are back in the flat blank portion of larger area, into peep-holes which are disposed in the resulting annular flange.

References Cited in the file of this patent

UNITED STATES PATENTS

| Number | Name | Date |
|---|---|---|
| 861,458 | Greenfield | July 30, 1907 |
| 1,376,735 | Stalhane | May 3, 1921 |
| 2,084,961 | Bondeson | June 22, 1937 |
| 2,315,685 | Bowers | Apr. 6, 1943 |
| 2,485,676 | Thomas | Oct. 25, 1949 |
| 2,506,398 | Thomas | May 2, 1950 |